United States Patent [19]

Nelson

[11] 4,434,185

[45] Feb. 28, 1984

[54] METHOD FOR PREVENTING DECAY OF FRUIT

[75] Inventor: Paul M. Nelson, Riverside, Calif.

[73] Assignee: FMC Corporation, Philadelphia, Pa.

[21] Appl. No.: 300,080

[22] Filed: Sep. 8, 1981

Related U.S. Application Data

[63] Continuation-in-part of Ser. No. 166,944, Jul. 8, 1980, abandoned, and Ser. No. 166,945, Jul. 8, 1980, abandoned.

[51] Int. Cl.³ .................... A23B 7/00; A23B 7/10; A23B 7/16
[52] U.S. Cl. .................... 426/308; 426/310; 426/333; 426/303; 426/532; 426/307
[58] Field of Search .............. 426/326, 321, 323, 331, 426/333, 335, 532, 303, 307, 310, 308

[56] References Cited

U.S. PATENT DOCUMENTS

| | | | |
|---|---|---|---|
| 1,900,295 | 3/1933 | Ore | 426/308 |
| 2,443,795 | 6/1948 | MacRill et al. | 426/323 |
| 2,460,710 | 2/1949 | Nolan | 426/308 |
| 2,489,744 | 11/1949 | Brogden | 428/308 |
| 3,139,347 | 6/1964 | Sair et al. | 426/281 |
| 3,189,467 | 6/1965 | Kalmar | 426/308 |
| 3,231,392 | 1/1966 | Sair | 426/281 |
| 3,370,957 | 2/1968 | Wagner et al. | 426/9 |
| 3,410,696 | 11/1968 | Rosenfield | 426/308 |
| 3,420,790 | 1/1969 | Gassner | 426/308 |
| 3,759,719 | 9/1973 | Hodel et al. | 426/308 |
| 3,888,984 | 6/1975 | Hughes | 426/323 |
| 4,006,259 | 2/1977 | Kalmar | 426/308 |

FOREIGN PATENT DOCUMENTS

| | | | |
|---|---|---|---|
| 219516 | 1/1957 | Australia | 426/326 |
| 526536 | 6/1956 | Canada | 426/326 |

OTHER PUBLICATIONS

J. Bacteriol. 771 pp. 573–580, 1959, Bell et al.
Food Technology 2/59, pp. 124–128, Klis et al.
Food Technology 10/55, pp. 486–488, Beneke et al.
Commercial Storage of Fruits & Veg. 1977, USDA Hnbk 66, p. 17.
Technology of Food Preservation 3rd. Ed. 1970, Desrosier, pp. 295, 296 AVI Publ.
Elements of Food Technology 1977, Desrosier p. 82, AVI Publ.
CRC Handbook of Food Additives 1972, 2nd Ed. vol. 1, Furia, CRC Press.

*Primary Examiner*—Steven L. Weinstein
*Attorney, Agent, or Firm*—Robert D. Jackson; Eugene G. Seems

[57] ABSTRACT

A method for protecting citrus fruit against resistant organisms by treating fruit with a combination of a soluble sorbate and at least one antifungal agent of the benzimidazole type, an alkali metal o-phenylphenol or sec.-butylamine.

3 Claims, No Drawings

METHOD FOR PREVENTING DECAY OF FRUIT

This is a continuation-in-part of application Ser. No. 166,944, filed July 8, 1980 and application Ser. No. 166,945, filed July 8, 1980, both of which applications are now abandoned.

This invention relates to protecting fruit against attack by decay-causing organisms, particularly by resistant strains of these organisms.

It is a well-known practice in fruit processing to apply antifungal agents to the surface of freshly harvested fruit for the purpose of controlling decay-causing organisms.

One such class of antifungal agents are certain substituted benzimidazoles of the formula:

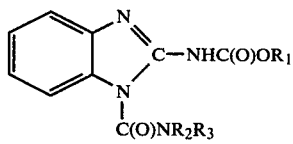

wherein R is methyl, ethyl, isopropyl or sec. butyl, $R_2$ is hydrogen, alkyl of 1 to 6 carbon atoms or alkenyl of 3 to 6 carbon atoms and $R_3$ is alkyl of 1 to 12 carbon atoms. A particularly active and preferred member of formula I is

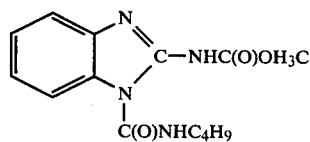

having the name methyl 1-butyl-carbamoyl-2-benzimidazole carbamate and known commercially as benomyl;

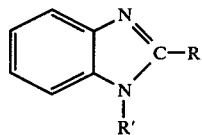

wherein R is a five-membered heterocyclic ring containing nitrogen and sulfur and R' is hydrogen, lower alkyl of 1 to 5 carbon atoms or lower alkenyl of 3 to 5 carbon atoms. A preferred member of formula II is

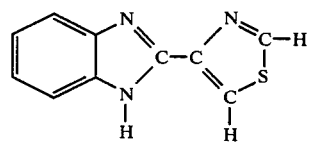

having the name 2-(4-thiazolyl) benzimidazole and known commercially as thiobendazole (TBZ); and

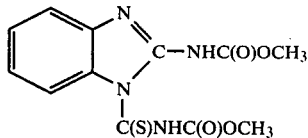

The benzimidazoles of formulas I, II and III are known chemical entities, the description and preparation of which are set forth in U.S. Pat. No. 3,370,957.

Other commonly used antifungal agents are sec.-butylamine and sodium o-phenylphenol tetrahydrate (SOPP).

Although the antifungal agents aforesaid provide generally satisfactory protection of the fruit, they are ineffective against resistant strains of decay-causing organisms such as resistant strains of penicillium, namely digitatum and italicum, which are penicillium species pathogenic to citrus. Manifestly, there exists a need to protect fruit against these resistant organisms.

It has now been discovered that decay of fruit by resistant organisms can be controlled by treating the fruit with an antifungal composition containing as its active components a sorbate selected from the class consisting of sorbic acid and potassium sorbate or mixtures thereof and at least one antifungal compound selected from the class consisting of sec.-butylamine, an alkali metal salt of o-phenylphenol tetrahydrate and a benzimidazole selected from the class consisting of

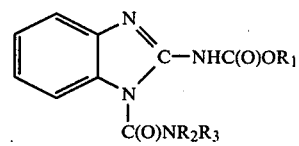

wherein $R_1$ is alkyl of 1 to 4 carbon atoms; $R_2$ is hydrogen, alkyl of 1 to 6 carbon atoms or alkenyl of 3 to 6 carbon atoms and $R_3$ is alkyl of 1 to 12 carbon atoms;

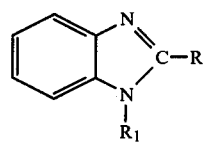

wherein R is a five-membered heterocyclic ring containing nitrogen and sulfur and $R_1$ is hydrogen, lower alkyl of 1 to 5 carbon atoms or lower alkenyl of 3 to 6 carbon atoms and

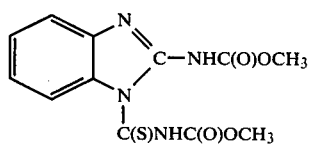

the weight ratio of the sorbate to antifungal compound being from about 2 to about 0.1 to about 2.

In carrying out the invention, fruit infected with resistant strains of decay-causing organisms is contacted with the herein antifungal compositions. This can be effected by dipping or spraying the fruit with liquids containing the antifungal composition. In one well-known procedure, the antifungal material is added to a water wax and the resulting mixture sprayed on the fruit. Water waxes consist of emulsified waxes or resins in an aqueous media and are extensively used to apply protective coatings on fruit. A typical water wax formulation contains shellac and the morpholine salt of a fatty acid.

In the commercial treatment of citrus fruit with an alkali metal salt of o-phenylphenol tetrahydrate commonly the sodium salt (SOPP), the fruit passes through a foam wash generated from an alkaline detergent solution of the SOPP. This cleans the fruit and coats it with SOPP. However, addition of sorbic acid or potassium sorbate to the SOPP solution interferes with its alkaline balance. Therefore, when treating citrus fruit with a sorbate and SOPP these should be contained in separate applicator liquids.

In one preferred embodiment of the invention the fruit is first coated with SOPP, then with potassium sorbate and finally with wax containing potassium sorbate and an antifungal agent of the type aforesaid. This procedure can be carried out in the packing house using existing equipment except for minor modifications to provide for addition of potassium sorbate. Thus, the fruit is passed through the standard foam wash to be cleaned and treated with SOPP. After rinsing and removal of free water, the fruit is contacted with 2% by weight aqueous solution of potassium sorbate, excess solution allowed to drain off, the adhering film partially dried, and the so treated fruit sprayed with a water wax containing by weight 0.3 to 0.4% TBZ and 2.0% potassium sorbate.

The invention is further illustrated by the following non-limiting examples.

EXAMPLE 1

Three treatments of twelve (12) oranges per treatment and 6 replications were each scratched (1 mm deep × 10 mm long) and the scratches smeared with a spore suspension containing $4 \times 10^6$ spores/ml. of penicillium digitatum of which 50% were TBZ resistant and 50% were SOPP resistant. After 24 hours, the inoculated oranges were subjected to the following treatments:

1. A 20 second dip and swirl in a water wax.
2. SOPP applied from a standard foamer followed by water wax containing 3000 ppm TBZ.
3. SOPP applied from a standard foamer followed by water wax containing 2000 ppm TBZ and 2.0% by weight of potassium sorbate. The results of the treatments are summarized in Table I.

The data in Table I clearly establishes that the compositions of the invention (treatment 3) are highly effective in controlling SOPP TBZ resistant strains of penicillium digitatum.

EXAMPLE 2

Shipping Test

Two separate shipping tests were conducted in a California packing house known to have TBZ resistance to determine the benefit of adding potassium sorbate to the normal packing house treatment of SOPP and TBZ for controlling TBZ resistant penicillium digitatum. Typical SOPP and TBZ residues on the fruit were 2.0 ppm and 2.6 ppm respectively. Two treatments were used:

(1) This treatment was the standard house treatment of SOPP (1.8%) foam wash and TBZ (3000 ppm) in a water base wax.

(2) This second treatment was the house treatment plus 2% potassium sorbate in the wax. Approximately 500 cartons of each treatment made up the shipment to each of two (Boston and Philadelphia) eastern fruit auctions. The fruit was inspected and the decays counted on arrival; enough cartons were inspected from each shipment to facilitate a statistical analysis of the data. In both shipment tests, the potassium sorbate added to house treatment of SOPP and TBZ significantly reduced the amount of penicillium decayed fruit. The results of the tests are summarized in Table II.

The shipping test data clearly shows the efficiency and practicality of controlling TBZ and SOPP resistant penicillium digitatum with the compositions of the invention.

EXAMPLE 3

Four treatments of thirteen light green lemons per treatment and 3 replications were each scratched (1 mm deep by 10 mm long) and the scratches smeared with a spore suspension containing $4 \times 10^6$ spores/ml. of a thiobendazole (TBZ) resistant strain of penicillium digitatum. After 18 hours, the inoculated lemons were subjected to a 20 second dip and swirl treatment in a water wax solution. The composition of the treatments and the percent decay of the lemons are summarized in Table III.

The data in Table III shows that the compositions of the invention are highly effective in controlling resistant penicillium digitatum whereas TBZ alone provides no significant protection.

EXAMPLE 4

Six treatments of eighteen tree ripened lemons per treatment and 3 replications were each scratched (1 mm deep by 10 mm long) and the scratches smeared with a spore suspension containing $6 \times 10^6$ spores/ml of a thiobendazole (TBZ) resistant strain of penicillium digitatum. After 24 hours, the inoculated lemons were subjected to a 20 second dip and swirl treatment in a test solution. The composition of the test solution and the percent decay of the lemons are summarized in Table IV.

The data in Table IV shows that the compositions of the invention are highly effective in controlling resistant penicillium digitatum whereas TBZ alone affords no significant protection. Treatment 6 shows that even greater control is achieved when the KS is first applied alone followed by KS/TBZ in the water wax. This particular combination is another preferred technique for applying the compositions of the invention. In fact, the antifungal activity of such compositions is sufficiently high whereby it may not be necessary to treat the citrus with SOPP. This would be an important commercial advantage since SOPP may burn tender fruit. In commercial practice, the KS would be added to the fruit wash in place of SOPP.

TABLE I

| Treatment | % Decay in 7 Days | % Decay in 16 Days |
| --- | --- | --- |
| 1 | 36 | 51 |
| 2 | 26 | 44 |
| 3 | 11 | 32 |

TABLE II

Average Number of Decayed Fruit
Per Carton From Three Sizes
115, 140, 165

| Location | House Treatment | House Treatment Plus KS[1] |
|---|---|---|
| Boston | 9.0 | 5.5 |
| Philadelphia | 6.1 | 4.0 |

House Treatment = SOPP plus TBZ
House Treatment Plus KS = SOPP plus TBZ and KS
KS = Potassium Sorbate The reduction in the average decayed fruit per carton is significant at the 99% confidence level.

TABLE III

| | Treatment | % Decay 7 Days | 30 Days |
|---|---|---|---|
| 1 | Water Wax Alone (Control) | 82 | 82 |
| 2 | Water Wax + 4000 ppm TBZ[1] | 67 | 67 |
| 3 | Water Wax + 2.0% by weight KS[2] | 31 | 31 |
| 4 | Water Wax + 4000 ppm TBZ and 2% KS | 8 | 18 |

[1]TBZ = Thiobendazole
[2]KS = Potassium Sorbate

TABLE V

| | Treatment | % Decay in 5 Days |
|---|---|---|
| 1 | Water Wax Alone (Control) | 98 |
| 2 | Water Wax + 3000 ppm TBZ[1] | 100 |
| 3 | KS as 2% Aqueous Dip followed by Water Wax | 21 |
| 4 | KS as 2% Aqueous Dip followed by TBZ with Water Wax | 18 |
| 5 | Water Wax + 3000 ppm TBZ plus 2% KS | 39 |
| 6 | Aqueous Application of 2% KS followed by Water Wax containing 3000 ppm TBZ plus 2% KS | 1.4 |

[1]TBZ = Thiobendazole
[2]KS = Potassium Sorbate

I claim:

1. A method of protecting citrus against strains of penicillium digatatum and penicillium italicum which have become resistant to the antifungal agents sec.-butylamine, sodium o-phenylphenol, 2-substituted benzimidazoles and sorbates, without chemically burning the fruit, comprising subjecting the fruit to the following sequential treatment:
   (1) applying to the fruit a coating of a sorbate selected from the class consisting of sorbic acid and potassium sorbate wherein said sorbate is about 2% aqueous solution of potassium sorbate or an equivalent amount of sorbic acid; and
   (2) applying to the sorbate coated fruit a wax containing as active components an additional 2% amount of the sorbate aforesaid and an antifungal agent selected from the class consisting of 1-butyl-carbamoyl-2-benzimidazole carbamate(benomyl) and 2-(4-thiazolyl)benzimidazole (TBZ).

2. A method of protecting citrus against strains of penicillium digitatum and penicillium italicum which have become resistant to the antifungal agents sec.-butylamine, sodium o-phenylphenol, 2-substituted benzimidazoles and sorbates, without chemically burning the fruit, comprising subjecting the fruit to the following sequential treatment:
   (1) washing the fruit;
   (2) wetting the washed fruit with about 2% aqueous solution of potassium sorbate;
   (3) removing free water from the wetted fruit thereby leaving a coating of potassium sorbate on said fruit;
   (4) wetting the sorbate coated fruit with a water wax containing as active components about 2% by weight of potassium sorbate and about 0.3 to about 0.4% by weight of 2-(4-thiazolyl)benzimidazole (TBZ); and
   (5) drying the fruit from wetting step (4) to give dried fruit having thereon a first layer of potassium sorbate and a second layer of wax containing as active ingredients potassium sorbate and 2-(4-thiazolyl)-benzimidazole (TBZ).

3. A method of protecting citrus fruit against strains of penicillium digitatum and penicillium italicum which have become resistant to the antifungal agents sec.-butylamine, sodium o-phenylphenol, 2-substituted benzimidazoles and sorbates comprising subjecting the fruit to the following sequential treatment:
   (1) treating the fruit with a foam wash containing sodium o-phenylphenol;
   (2) rinsing the treated fruit from (1);
   (3) wetting the rinsed fruit from (2) with about 2% aqueous solution of potassium sorbate;
   (4) removing excess solution from the sorbate treated fruit from (3);
   (5) wetting the sorbate treated fruit from (4) with a water wax containing an active ingredient by weight about 0.3 to 0.4% 2-(4-thiazolyl)benzimidazole and about 2% potassium sorbate and
   (6) drying the fruit.

* * * * *